US007314178B2

(12) United States Patent
Rines et al.

(10) Patent No.: US 7,314,178 B2
(45) Date of Patent: Jan. 1, 2008

(54) METHOD OF AND APPARATUS FOR CONTROLLING THE SELECTION, INITIATION AND EXECUTION OF COMPUTER PROGRAMS AUTOMATICALLY AND DIRECTLY IN RESPONSE TO THE REMOTE (OR PROXIMAL) SCAN OF SPECIAL BARCODES OR OTHER CODED INDICIA, IN DIRECT RESPONSE TO RECEIVING THE BARCODE SCAN SIGNALS FROM THE READER, AND WITHOUT OTHER HUMAN INTERVENTION

(75) Inventors: Robert H. Rines, 65 E. India Row, Boston, MA (US) 02110; Paul Saindon, Goodrich, MI (US); Elijah Ercolino, Kila, MT (US); Justice C. Rines, New York, NY (US)

(73) Assignee: Robert H. Rines, Boston, MA (US)

( * ) Notice: Subject to any disclaimer, the term of this patent is extended or adjusted under 35 U.S.C. 154(b) by 316 days.

(21) Appl. No.: 11/011,840

(22) Filed: Dec. 14, 2004

(65) Prior Publication Data

US 2006/0124742 A1 Jun. 15, 2006

(51) Int. Cl.
*G06K 7/10* (2006.01)
(52) U.S. Cl. .............................. 235/472.01; 235/462.25
(58) Field of Classification Search ...............
235/462.01–462.25, 375, 472.01, 472.02,
235/472.03, 454, 455, 380
See application file for complete search history.

(56) References Cited

U.S. PATENT DOCUMENTS

| | | | | | |
|---|---|---|---|---|---|
| 5,506,697 | A | * | 4/1996 | Li et al. ...................... | 358/448 |
| 5,640,193 | A | * | 6/1997 | Wellner ....................... | 725/100 |
| 5,869,819 | A | * | 2/1999 | Knowles et al. ............ | 235/375 |
| 5,903,729 | A | * | 5/1999 | Reber et al. ................. | 709/219 |
| 5,940,595 | A | * | 8/1999 | Reber et al. ................. | 709/227 |
| 5,971,277 | A | * | 10/1999 | Cragun et al. ......... | 235/462.01 |
| 6,012,102 | A | * | 1/2000 | Shachar ......................... | 710/5 |
| 6,081,827 | A | * | 6/2000 | Reber et al. ................. | 709/200 |
| 6,108,656 | A | * | 8/2000 | Durst et al. .................... | 707/10 |
| 6,148,331 | A | * | 11/2000 | Parry .......................... | 709/218 |
| 6,199,048 | B1 | * | 3/2001 | Hudetz et al. ................. | 705/23 |
| 6,330,976 | B1 | * | 12/2001 | Dymetman et al. ......... | 235/487 |
| 6,505,776 | B1 | * | 1/2003 | Wilz et al. ............. | 235/462.01 |

\* cited by examiner

*Primary Examiner*—Thien Minh Le
(74) *Attorney, Agent, or Firm*—Rines and Rines

(57) ABSTRACT

A technique for automatically controlling a computer by the remote (or proximal or local) scanning of special coded-indicia to execute computer-stored programs directly and automatically in response to computer-translated instructions represented by the scanned coded indicia, such as the presentation of specified supplemental pictorial and other website stored materials to the reader of a book or magazine or the like containing such coded indicia keyed to said website, and more generally, to cause the computer automatically to execute desired programs in direct response to such coded indicia scanning.

52 Claims, 2 Drawing Sheets

Figure 1:
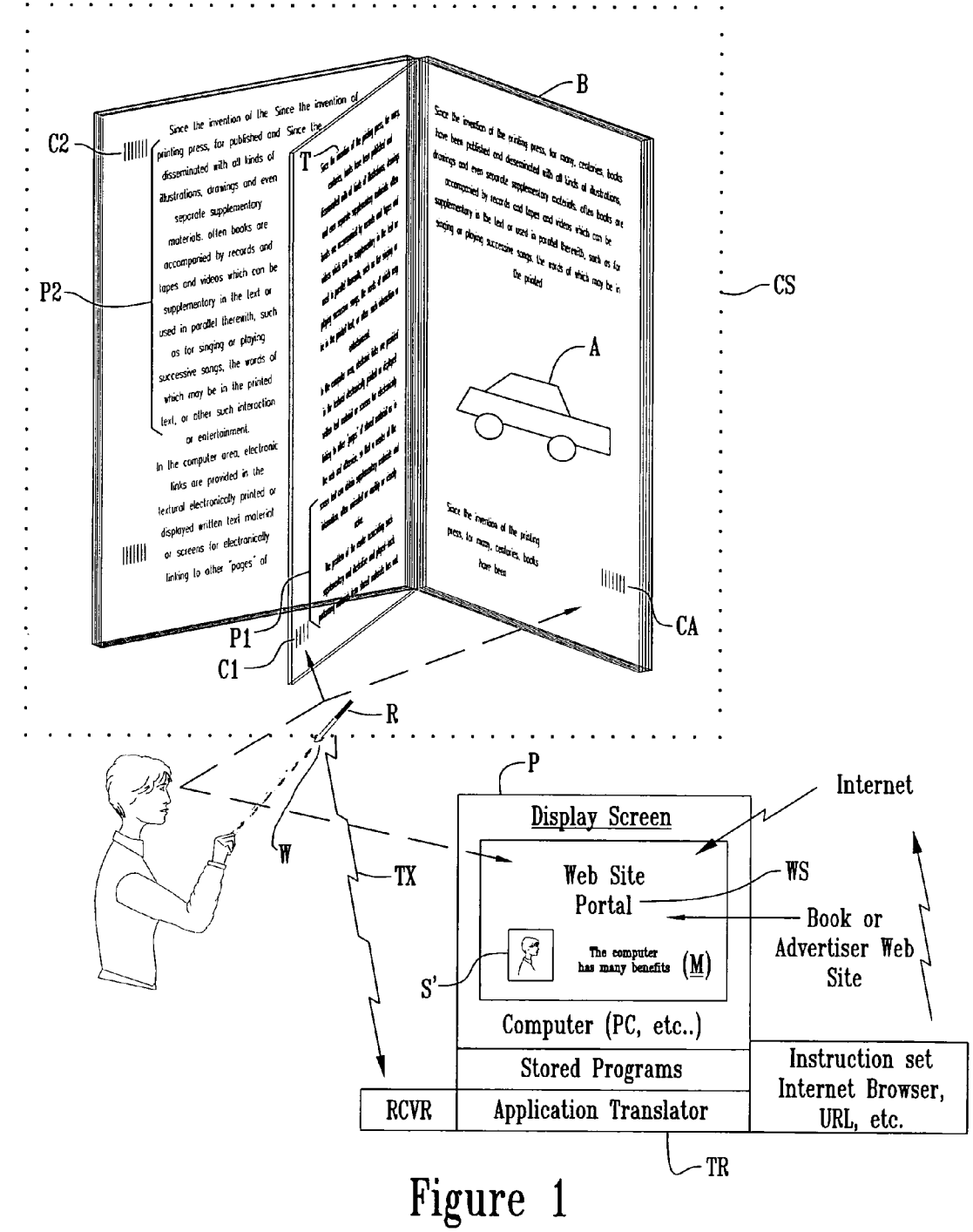

METHOD OF AND APPARATUS FOR CONTROLLING THE SELECTION, INITIATION AND EXECUTION OF COMPUTER PROGRAMS AUTOMATICALLY AND DIRECTLY IN RESPONSE TO THE REMOTE (OR PROXIMAL) SCAN OF SPECIAL BARCODES OR OTHER CODED INDICIA, IN DIRECT RESPONSE TO RECEIVING THE BARCODE SCAN SIGNALS FROM THE READER, AND WITHOUT OTHER HUMAN INTERVENTION

FIELD

The present invention relates generally to automatically providing the reader of a publication such as a book, magazine or the like, on the reader's demand, with automatic access to supplemental pictorial and other materials related to a specific subject matter content of particular portions of the publication being read, as upon a reader-viewable computer, TV or similar screen. This is effected by means of reader-scanning of selected special barcode or similar coded indicia provided in the book in conjunction with such book portions, and the code (track) of which identifies and instructs the accessing of such specific content-related corresponding pictorial materials pre-stored in memory associated with the computer, TV or similar storage media (CD, DVD, etc.) operable with viewing equipment, all as described in co-pending application Ser. No. 10/807, 894 filed Mar. 24, 2004 for:

Method Of And Apparatus For Supplementing The Reading of Selected Passages Of Printed Material In A Book Or The Like By Electronically Reading Coded Indicia Provided In The Book At Such Passages To Access The Playing Of Corresponding Coded Tracks Of Pre-Recorded Video/Audio Supplemental Material Respectively Related To The Selected Passages.

BACKGROUND

More specifically, as also disclosed in said application, this invention also contemplates use of storage provided on internet websites serving as the storage medium and containing pre-stored supplemental pictorial and other material, with the desired website and portions thereof being automatically computer-accessed by the book reader in direct response to the scanning of a specific book portion barcode; for example, for enabling automatic viewing of the related supplemental pictorial material stored on a selected portion or section of the selected web display, and all in automatic and direct response just to the reader's scanning or activating of the selected barcode in the book and the transmitting of the code scan signals as instructions to the computer.

The present invention is not, of course, the first proposal to use barcode technology in cooperation with computer or microprocessor operations or internet websites. In connection with the general area of prior art technologies for accessing select web displays, for example, ornamental barcodes or symbols have been proposed for indicating a link to a product and a remote location on the web network, as in U.S. Pat. No. 6,708,208. The ornamental symbol created by the dark and light bars of the code serves the function of directing a web browser application of a computer to retrieve and display information in conjunction with such unique barcode ornamentation pattern. In further U.S. Pat. No. 6,098,106, other guiding techniques to a personalized web page are described, as by a television signal for triggering a computer browser response; or by the inputting of an audio tone into the computer to control a web browser software application.

Further on the subject of prior art techniques for accessing of a remote location such as a web with the aid of the scanning of an optical code, reference is also made to U.S. Pat. No. 6,745,234. In this proposal, a first computer disposed on the network connects to a scanner for scanning the optical code of a product by a user. The scanner is uniquely identified with a scanner distributor by a scanner identification number. A second computer server disposed on the network is accessed in response to the user scanning the optical code with the scanner, wherein a lookup operation is performed at the second computer to match the scanner identification number with the scanner distributor to obtain remote routing information of the one or remote locations. The remote routing information, in turn, is returned from the second computer to the first computer in order to access the one or more remote locations disposed on the network. Such remote locations are then accessed to return remote information to the first computer for presentation. In both this U.S. Pat. No. 6,745,234 and in previously mentioned U.S. Pat. No. 6,708,208, moreover, a copious list of prior US and foreign patents and publication references in his general field has been provided, a review of which indicates that the above-cited patents are probably quite representative of the most relevant types of prior art approaches by others in this field and to prior types of uses of barcode technology with computers; but such are hardly anticipatory of the new technological concepts and novel results flowing therefrom underlying the present invention.

Those concepts underlying the present invention, indeed, unlike such prior art barcode design and usage, employ the digital code sequence content of the selected barcode itself (corresponding to a reader-selected portion of the book), not only to identify the selected corresponding pre-stored supplemental pictorial or other supplemental material portion in memory—i.e. the corresponding track or portion or section of the memory storage—but also contain instruction information for effecting the direct and automatic accessing and playing on the computer, TV or other player or display screen that is within view of the reader during the book reading.

Examples presented in said co-pending application, include storage media in the form of (1) separate CD or DVD memory storage disks or tapes with coded tracks corresponding to the respective book barcodes and players associated with a computer or TV screen display or the like that the barcode scanning signals transmitted to the computer set into automatic accessing and playing operation;

(2) software and computer memory implementation or simulation of such CD or DVD media storage and playing; or (3) the use of web page storage accessible on the internet.

In case (1) of the CD, DVD or similar disk or tape player, a separate CD or DVD memory disk player is associated with a computer or TV display screen or the like, and the supplemental pictorial or other material pre-recorded on the respective coded tracks or portions of the storage disk, corresponding to the respective barcodes in the book, are automatically selected and instructions for executing the playing on the screen are transmitted by the reader scanning of the special barcode in the book, as with the aid of an appropriate scanning or activating barcode reader and remote wand for transmitting the scanned signals and the instruction information they represent to the computer, player, TV, etc.

In the computer software implementation (2), above, the memory and operation of a separate CD or DVD and player is simulated in the computer. The transmission of the reader-selected and scanned barcode digit sequence signal instructions are received at the computer and directly correlated with the pre-recorded corresponding track codes of the CD, DVD, etc., with the barcode digits also providing instruction information for the playing of the selected supplemental pictorial material, all directly in response to the digit information represented in the barcode code content that automatically effects play and display on the screen.

As before stated, however, the present invention is primarily directed to case (3), above; i.e. the use of material stored in the web as the supplemental pictorial or other material to be accessed by the book reader. The primary interest of the present invention, indeed, is in a vastly different and novel usage of the barcode and the particular kind of digital sequence content information for the purposes of the invention, and also in a highly novel computer direct operational response to the barcode scan signals themselves as received at the computer from the reader scanning and transmitting the scanned signals to the computer.

Additionally to providing significantly new results and automatic reader access to web-stored supplemental pictorial and other materials, the present invention more broadly greatly simplifies prior art systems for accessing internet web pages generally, and opens up a new area for direct barcode (or similar) automatic selection and execution of computer applications—remotely or locally—without the necessity for present-day computer operator intervention to reach a website and specific portions thereof; and, in the specific case of web portal access, without requiring the manual steps of the current-day computer operator. Further, for access to web portal selected portions intended only for subscribers or special groups, a significantly improved and simple technique therefor, as well.

A particular application of important interest, is to facilitate a magazine reader's automatic access to the magazine web page for information/news up-dating, or to an advertiser's web page, through the novel barcode (or similar) preparation and usage of the invention in the magazine, and the automatic access directly to the exact supplemental up-dating material on the web page under the control of the reader's scan of the barcode—automatic accessing directly to the desired up-dating portion of the web page without need for the presence or intervention of a computer operator or the computer accessing steps presently required—and further with automatic security for subscribers or special groups only accessing selected portions of the web pages.

Common, however, to all the various possible supplemental pictorial and other material storage media (1), (2) and (3) above is their reader-accessing in response to the receipt of scanned barcode indicia (or similar) technology designs containing not only digital representations identifying the coded information selection,—i.e. on the corresponding track portion of the memory disk or tape, or in the corresponding computer memory portion, or on corresponding internet website portion—but also representations corresponding to operational instructions for executing the respective selection, initiation and running of the respective programs or procedures to cause the playing or displaying of the selected stored supplemental pictorial or other material, automatically upon the screen of a computer (laptop) or TV or similar such display within the reader's view.

And in the particular case of the primary thrusts of the present invention involving the reader directly barcode-accessing specific internet websites or portions stored thereon, the novel barcode usage of the invention automatically causing the computer to select and follow application execution instructions corresponding to the barcode encoded digit and sequence representations, as directly translated therefrom upon receipt of the reader's scan signals at the publication, transmitted to the computer—accessing the website directly and automatically and all without human intervention.

Again it should be noted that the invention thus radically differs from present-day internet website storage—accessing, and is distinctly different from prior system usage of barcodes and the like in connection with both computers and web-site accessing, such as, for example, the before-mentioned U.S. Pat. No. 6,745,234. In the latter system, for example, the scan of a mere customary digit barcode is received at a computer and is immediately transferred to a separate server out on the internet. When such a conventional barcode scan is received, the computer doesn't do anything except send it off to a third-party code server. That server has a large list of all the different barcodes out there that can be scanned, and merely performs cross-referencing to a list of websites in the barcode server; and, having found the appropriate website, sends information from the server to open up a web browser, with the server selecting the website to be opened up.

In accordance with the decidedly different approach of the present invention, on the other hand, no third-party barcode server is ever required. This invention makes novel use, rather, of specifically encoded digits and sequences that preferably digitally represent an instruction set of computer operating steps. Upon receipt of the reader-selected and scanned barcode signals transmitted by the wand (or otherwise) to the computer, a special application provided at the computer translates these digital representations directly into a series of corresponding computer-understandable and executable instructions. These instructions are then directly thereupon executed by the computer—for example, open a web browser and go to this particular page or portion on this particular website—and automatically, without any human intervention or steps at the computer, enabling the reader to see that particular page of the particular website thus brought up on the computer screen.

The mere listing of an internet web page in a publication requires that the reader must enter the symbols on a computer search, and then follow the usual computer routine steps to bring up the web page.

Those steps are
1. open a web browser (Internet Explorer, for example);
2. type in URL of the magazine website to get to the portal page (www.Newsweek.com);
3. using the mouse, scroll down the portal page to locate desired story or subject matter portion; and
4. click on that selected portion to bring story to the screen.

As before shown, the invention and its novel type of and use of special barcode technology obviates all these operator steps that the whole world, presently, has to use.

If a portion of the website is to be reserved for publication subscribers or special customers, as earlier mentioned, with the public to be denied access thereto, current practice requires the computer user to type in the subscriber's name and password in order to permit access to the selected subscriber or special customer materials. With the invention, on the other hand, a subscriber or special customer digit(s) may be simply placed in the barcode and can automatically provided such access with security to the targeted desired group only.

And if the publisher or advertiser wants information back from the reader, a special digit(s) in the barcode can be reserved for such purpose, with the reader registering a response or reply by the scan, as for taking an opinion poll or for other tabulation at the computer, as later discussed in connection with FIG. 2 of the drawings. A second barcode scan can also distinguish negative and positive responses, if desired, or multiple barcodes can be provided, or partial and complete barcode scans can provide for different responses.

The invention, furthermore, is even more remote from other types of prior uses of barcodes as for inventory comparison and related product accessing information, and for store checkout printing or other billing and/or inventory tracking. It has also been proposed, as in U.S. Pat. No. 6,760,884, to organize photographs with or without commentary, on the website, as by associating each photograph (or other physical object) with a specific barcode. This is intended to aid an author in organizing photos to generate a story about them and make the story accessible on a website.

OBJECTS OF INVENTION

A primary object of the invention, accordingly, is to provide a new and improved methodology and apparatus for the reader of a book or magazine or the like automatically to access specified supplemental information relevant to the reading and stored on internet websites, by merely scanning or activating a special kind of barcode or the like printed or presented in the book or magazine and containing special coded elements representing instructions for a computer automatically to access the internet and find relevant supplemental material web pages and specific portions thereof corresponding to the subject matter of the book or magazine portion, all without intervention of a computer operator and in direct response to only the computer reception of the scan barcode content information.

A further object is to provide automatically for the additional targeted accessing to select portions stored in the web portal by subscribers or other select groups only.

Still a further object is to provide a new and improved barcode or similar direct control of the selection, initiating and running of computer applications more generally, without the presence of computer operators, auxiliary servers or supplemental computers or the like, but rather in direct response only to instructions encoded into the barcode sequences or patterns themselves.

An additional object is to provide for such novel barcode-controlled computer application control through receiving the barcode sequence information keyed to and representing desired computer-program selecting and program operating or executing instructions, and directly translating said sequence information into computer-understandable instructions to which the computer then directly responds.

Other and further objects will be hereinafter pointed out and more fully delineated in the appended claims.

SUMMARY

In summary, however, in connection with the important application of the invention in the providing of supplemental pictorial and other material stored in an internet website to a book or magazine reader, the invention embraces a method of providing a reader of a publication which is associated with a corresponding publisher internet website and portal, with automatic computer display screen access to the website portal and to a desired specific subject matter portion of the website stored thereon, that comprises, providing barcode indicia in the publication that respectively uniquely correspond to different subject matter portions or passages therein;

storing at different specific portions of said website, supplemental pictorial and other material related respectively to such different subject matter portions or passages of the publication and their corresponding respective barcode indicia;

encoding each barcode indicia with a set of digits and sequences thereof that digitally represent and identify the corresponding URL and the respective specific portions of the website, and also a set of digits and sequences that represent a computer application program of instructions to open a browser and proceed directly to that URL and said specific portion of the website; enabling the reader of the publication to select and effect scanning of the desired barcode indicia and transmitting the scan signals to the computer; and responding at the computer to the receipt of the reader-selected barcode scan signal transmission by thereupon directly translating the received scanned barcode digits and sequences into a corresponding computer-understandable instruction set to cause the computer thereupon to execute those instructions, thereby automatically to open the browser and proceed directly to that URL and directly to execute said instructions to provide a screen display of the desired supplemental pictorial and other material stored on the corresponding selected subject matter website portion, all without any human intervention, apart from the reader effecting scanning of the selected publication barcode indicia at the publication.

With regard to the more generic concept of direct use of special barcode sequencing information representative of computer operating instructions for directly and automatically running selected computer applications, and without requiring operator intervention, the invention also involves a method of barcode control of the operation of a computer containing specific programs, that comprises, providing barcode indicia encoded with digits and sequences thereof that respectively correspond to and digitally represent specific computer operational instructions for operating a specific program stored in the computer; scanning the barcode indicia and transmitting the scan signals to the computer; responding at the computer to the receipt of the barcode scan signals transmission in an application stored in the computer for translating the received scanned barcode digits and sequences directly into corresponding computer-understandable instructions of said specific program operational instructions to cause the computer thereupon to execute those instructions, thereby automatically and directly to cause the computer to initiate and operate said specific program, all without any intervention apart from the scanning of the barcode indicia.

Best mode designs and preferred implementations are hereinafter presented in detail.

DRAWINGS

The invention will now be explained in connection with the accompanying drawings, FIG. 1 of which is a schematic overall system diagram illustrating the reader's supplementing of book or magazine materials with internet web-stored related or updated supplemental pictorial and other materials through the use of special coded barcode sequences representing a set or corresponding sequence of computer operating instructions and to be scanned by the reader during such reading. In response to the transmitting of such scanned barcode signals, a computer within viewing range of the reader, automatically accesses the correspondingly relevant supplemental pictorial and other portions of a selected web portal over the internet, directly and automatically in response to the received scanned barcode information as translated into a computer-executable corresponding instruction set.

As earlier noted, while the invention is particularly useful for enabling a reader to access internet web pages automatically, underlying perhaps the broadest novelty involved in this concept, as disclosed in said copending application, is the use of such barcode or similar technology, specially implemented, directly to control the selection, initiation and running of computer programs or applications in response to the scanning of the barcode, remotely or locally or proximally of the computer, adapted to run such programs or applications.

Figure 2:
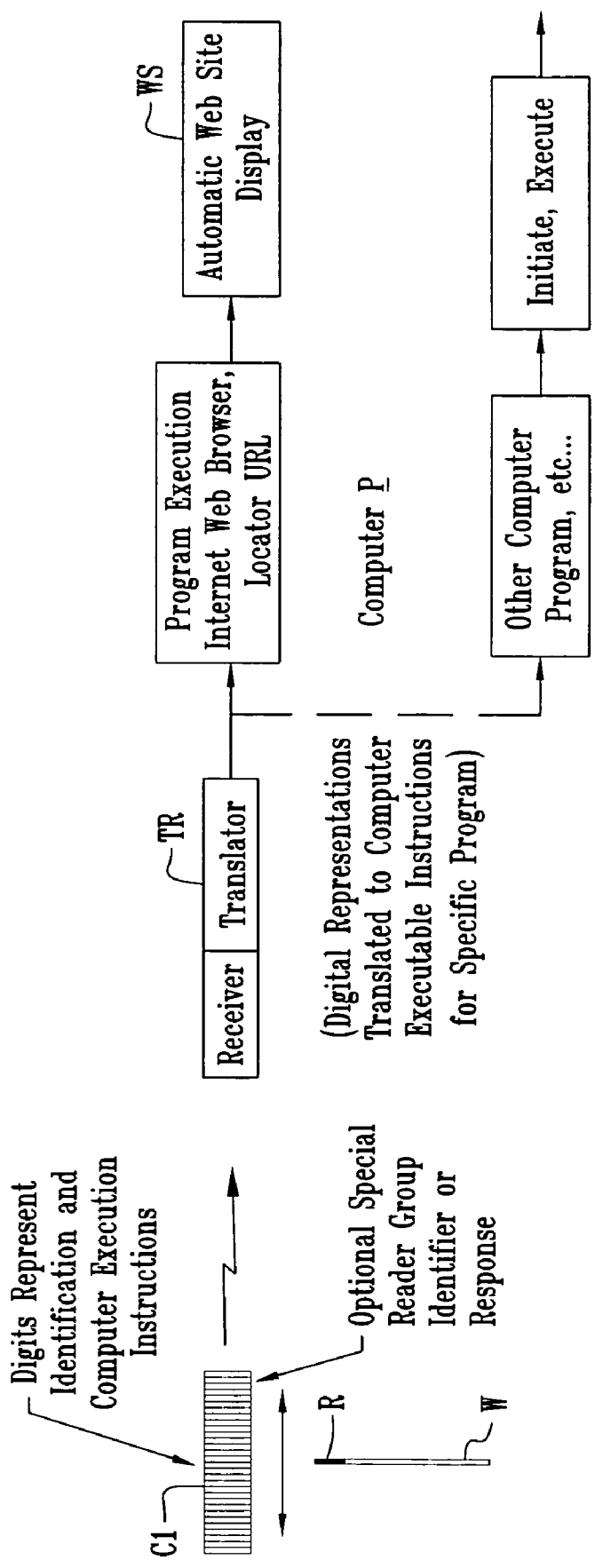

FIG. 2 thus illustrates not only such web page automatic accessing, but more generically also illustrates, in the dash-line option, the automatic execution of any selected computer-stored program in direct response to the receipt of correspondingly keyed special scanned barcode signals transmitted to the computer, and without the customary computer operator (or reader) interventions at the computer.

DESCRIPTION OF PREFERRED EMBODIMENTS OF THE INVENTION

Referring to the drawings, a schematic diagram of the preferred implementation of the invention as applied to automatic reader retrieval of web-site-stored supplemental pictorial and other information is presented in FIG. 1. A user-reader is there shown reading a publication B (book or magazine, for example,) containing different subject matter portions or passages $P_1$, $P_2$, etc., provided with respective barcode indicia C1, C2, etc. (illustratively shown relatively short enough to fit in the margin) uniquely corresponding to the different subject matter portions and which are encoded representatively to identify and access corresponding different specific portions of the publisher's internet website on which supplemental pictorial and other materials related to the various subject matters in the publication are stored, up-dated, etc. and which the reader would like conveniently and automatically to view as the book is being read. In FIG. 1, the viewing is shown on the "Display Screen" of a computer P, such as a laptop or the like, shown remote from the reader, but preferably within the reader's view as the reader reads the publication. The computer may also be near or proximal to the reader. And, indeed, a separate screen (schematically shown at S') relaying or displaying the content presented on the computer screen may remote such viewing content to the reader, if desired.

As earlier explained, in accordance with the present invention, the special barcode indicia C1, C2, etc. are encoded with digits and sequences thereof (shown schematically as a short sequence of vertical digit lines) that are created and keyed to digitally represent and identify each of the respective subject matters of the respective book portions presented on passages P1, P2, etc. and as to which corresponding related supplemental pictorial and other materials stored on the publisher's internet website are to be brought up on the computer P and accessed for viewing at WS on the screen. The barcode indicia, also in accordance with the invention, are constructed to include a set of digits and sequences thereof that are keyed to and thus represent and identify the publisher's well-known website URL descriptors (universal resource locator) and the specific portions or sections M of the website containing such on-line specific subject matter supplemental pictorial and other material and categories; and also a sequence of the digits representing specific computer program operating instructions to open a browser and proceed directly to that URL and the specific portion or section of the website.

When the reader has selected a particular subject matter barcode, say $C_1$, for accessing (on the publisher's website WS) corresponding subject-matter supplemental pictorial and related materials, the reader merely scans a barcode electronic reader R and transmits (TX) the special scanned barcode digits and sequences above-described to a receiver "RCVR" at the computer P, as by an associated wireless or wired selector wand transmitter W (radio, sound, infrared, etc.) as schematically shown and as disclosed in said copending application, and as later further discussed.

With the invention, the received barcode scan signals are directly applied to an application translator program TR stored at the computer that thereupon directly translates the received scanned barcode digits and sequences into corresponding computer-understandable instruction sets; first, a digit sequence that represents and, after scanning and receipt at the computer, is translated at TR into computer-understandable language to command the operating system to open its default web browser ("Internet Web Browser" of FIG. 2), identifying a specific website page and URL; and also a further digit sequence that represents and, after such scanning and receipt at the computer, is translated at TR as a computer understandable application execution program ("Computer Execution Instructions", FIG. 2), automatically to execute such program in opening the web browser and downloading said URL from the Internet (so-labeled in FIGS. 1 and 2), thereby automatically displaying the desired specific website page on the screen (M). This causes the computer thereupon automatically to execute these instructions and thereby automatically and directly bring up a screen display (M) of the desired supplemental pictorial and other materials stored on the accessed corresponding selected subject-matter website portion or sections or categories. This automatically occurs as the reader is reading the publication and requires no reader or other human intervention—no computer operator—apart from the reader scanning the selected barcode indicia at the place of reading the book.

The practical result attained with the invention is that when the reader scans a selected barcode, a website with desired supplemental pictorial and other related materials automatically appears on a computer screen.

One of the important uses of this technique is for time-sensitive publications such as newsmagazines and the like, where today the reader may obtain supplemental up-dating on-line information between the weekly, monthly or other periodic publishing dates of the magazine by looking up the web page citation in the magazine, physically going to a computer and then going through the before-described current computer-operating steps and searching to bring up the website and see the new materials that are being continually added on-line to the magazine publisher's website.

The use of the special barcode and its scan by the reader, without leaving the reader's chair or bed and without operating the computer, automatically to access the website supplemental materials and without searching, represents a significant advance.

Similarly, automatically accessing an advertiser's website by scanning such a special barcode CA presented in an advertisement A, as in the publication B, provides the same measure of advantage over the current mere listing of the website address in the advertisement for the reader to access and search in a conventional manner at a PC or other computer.

And, in connection with the before-mentioned providing of access to particular website sections or portions only to subscribers, or customers or a special group or groups, a special digit or other special group identifier may be provided in the barcode sequence, as shown in FIG. 2, and/or such may be used as a reader reply to the computer for tabulation or other purposes as also previously described.

The reader scanning of the barcode indicia in the publication may be conveniently and preferably effected by the before-mentioned reader-operated hand tool comprising an electronic reader head R, FIGS. 1 and 2, with or without a light illuminator, for swiping or scanning over the barcode indicia and connected with, preferably integrated with, a well-known wand selector W as of conventional program or track TV and appliance types for selectively transmitting the scan signals by wireless (radio, acoustic, light, as before indicated) or wired transmission to the computer P—for example, as more fully described in said copending application. As also explained in said application, the "book" may be in printed or written format or electronically "printed" or presented as on an electronic screen display (schematically illustrated as CS in FIG. 1), the term "book" or "publication" as used herein being intended generically to embrace bound or other books, newspapers and other publications, magazines, brochures, pamphlets, flyers, sheets and computer or other electronically presented "printed" displays—in short, all types of media containing readable information.

Apart from the internet, as desired, the reader may access such supplemental pictorial and other materials as stored in any type of computer memory files, archives, webs, etc. or other storage media accessible by or through a computer, all directly and automatically under the control of the special barcode indicia of the invention. It should be understood, moreover, as discussed in said copending application, that the encoded indicia may also assume other forms or types of optical or other code elements than the preferred barcode line or striped "digits", including, for example, those discussed in the previously cited patents.

While illustrated as such widely used vertical line-encoded barcodes C1, C2, etc. and associated barcode reader scanner R, as of the laser or other light scanner types described in said copending application and also herein, clearly other types of coded-indicia may be applied to the publication, and corresponding scanning readers may also be employed for the purposes of the invention. These also include the more recent proposals for radio frequency ID (RFID) chips, termed Electronic Product Codes (EPC), which, for the present invention, may be affixed at the appropriate portions of the book, magazine or other publication or the like, and may be scanable by corresponding appropriate radio-wave scanners, again at the initiation of the publication reader. The quite different usage of the latter form of EPC "barcode" indicia and RFID in tracking products shipped, stocked or sold and which "does nothing more than to point you at data available somewhere else", but with the great advantage of providing "a uniform system for matching the codes with detailed product information, which can be stored anywhere on the web"—an "Internet of inventory"—is recently described in an article entitled "Beyond the Bar Code", by Wade Roush, appearing in *Technology Review*, December 2004, pages 20 and 21. Though the present invention may also be implemented with such EPC and RFID technology, clearly the special encoding and its novel usage in the invention for its quite different purposes, are totally remote from prior such and other inventory tracking proposals and usages.

In an experimental prototype for accessing computer memory-stored supplemental pictorial and document materials, each of still pictures, documents, slideshow, videos and movies were successfully accessed both on a laptop screen and on a television set screen by such special encoded barcodes and computer application translator with its keyed directory structure. Using three-digit numbers, if the number ended in 99 (for example, 199, 299, etc.) the application recognized it was to open a stored slideshow application. The number 100 indicated a 100 series of stored photographs. If the last two numbers were 0 to 80, in this example, the application recognized these were photographs—say 112; i.e. open the photograph program file and go to photograph 12. In this prototype, 80 to 90 identified movies; and 90 to 98 were audio files—someone speaking. Thus, just based upon the barcode number representations themselves, the application looked up the files it knew existed and instructed the playing of those files. In this implementation, the files were stored on a laptop computer and were sorted into directories with all the files in the directories. As before indicated, the 100 series files represented a slideshow and the subdirectory thereof would play the series of pictures of that slideshow, the files having been stored on the computer with this specific directory structure in the 100 digit series representing the desired file structure for execution. The barcode scanner reader R and transmitter W used were the type Baracoda Pencil of Baracoda Inc. of Brooklyn, N.Y., using Blue Tooth radio communication TX.

In the application of this procedure to, for example, a magazine website, ten or more digits in the barcode may be desirable. For example, the first digit might indicate or represent a magazine website. The next two digits might indicate a specific subject matter and further digits, a particular portion(s) of the specific publication website. As the barcode is scanned, thus, the received signals identify that a website is to be accessed, then identify the magazine, then provide instruction to go to that magazine website (www.Magazine.com) and then to a specific article—that whole structure built into the specially encoded barcode being translated by the application provided in the computer to command the opening of the web browser and going to the desired portion for the magazine updates.

As before stated, other types of encoded data indicia than "one-dimensional" barcode parallel lines may be used also for the purposes of the invention, including the previously mentioned ornamental patterns and other two-dimensional data identifiers or tags (all generically referred to as "barcodes") that enable more information to be incorporated in the encoding, particularly for quick response reading, as described, for example, in an article entitled "The Code That Ate Tokyo" appearing in the December, 2004 issue of WIRED magazine at page 030. The latter patterns of socalled "quick response" codes can hold large amounts of information particularly useful for URLs for web site locators.

Various further modifications such as providing the reader with an automatic barcode scan facility, or making use of the automatic supplemental material-accessing of the invention by others than a reader, and operating-computer-controlled processing by the special coded indicia technique of the invention, will occur to those skilled in this art and they are intended to be embraced within the spirit and scope of the invention as defined in the appended claims.

What is claimed is:

1. A method of providing a reader of a publication which is associated with a corresponding publisher internet website and portal, with automatic computer display screen access to the website portal and to a desired specific subject matter portion of the website stored thereon, that comprises, providing barcode indicia in the publication that respectively uniquely correspond to different subject matter portions or passages therein;

storing at different specific portions of said website, supplemental pictorial and other material related respectively to such different subject matter portions or passages of the publication and corresponding respective barcode indicia;

encoding each barcode indicia with a set of digits and sequences thereof that digitally represent and identify the corresponding URL and the respective said specific portions of the website, and also a set of digits and sequences that represent a computer application program of instructions to open a browser and proceed directly to that URL and said specific portion(s) of the website;

enabling the reader of the publication to select and effect scanning of the desired barcode indicia and transmitting the scan signals to the computer; and responding at the computer to the receipt of the reader-selected barcode scan signal transmission by thereupon directly translating the received scanned barcode digits and sequences into a corresponding computer-understandable instruction set to cause the computer thereupon to execute those instructions, thereby automatically to open the browser and proceed directly to that URL and directly execute said instruction to provide a screen display of the desired supplemental pictorial and other material stored on the corresponding selected subject matter website portion, all without any human intervention, apart from the reader effecting scanning of the selected publication barcode indicia at the publication.

2. The method claimed in claim 1 wherein the reader of the publication is remote from the computer, but is enabled to view the display content of the screen.

3. The method of claim 1 wherein the reader scans the barcode at the publication with a barcode electronic reader and transmits the barcode scan signals to the computer by an associated wireless or wired wand transmitter.

4. The method of claim 1 wherein the barcode indicia also includes digital information identifying publication or website subscribers or a special group of publication readers for providing selective access thereto of specific website portions not otherwise or generally available to web inspection.

5. The method of claim 1 wherein said subject matter portions or passages of the publication comprise product or service advertisements also associated with their own internet website portals and wherein such advertisements are provided in the publication with corresponding barcode indicia coded to identify the specific advertiser's website, with the reader scan of such barcode indicia at the advertisement in the publication automatically causing the displaying on the computer screen of the desired supplemental pictorial and other advertiser material stored on the corresponding subject matter website portion of the advertiser's website.

6. The method of claim 5 wherein the advertiser's barcode indicia also includes digital or related information identifying publication subscribers or a special group of publication readers for providing selective access thereto of specific website portions not otherwise or generally available to web inspection.

7. The method of claim 1 wherein the barcode indicia further includes digit or related information serving as a reader response or reply to the publication publisher or an advertiser, for noting or tabulation at the computer.

8. The method of claim 1 wherein said translating is effected by providing an application at the computer that receives the scanned barcode digits and translates them into a series of corresponding computer instructions for thereupon being directly executed by the computer automatically to access the desired website portion.

9. The method of claim 1 wherein said publication is of a format selected from the group consisting of printed or written books, magazines, newspapers, brochures, pamphlets, flyers, sheets and electronically presented "printed" displays.

10. A method of providing a reader of a published product or service advertisement which is associated with a corresponding advertiser internet website, with automatic computer display screen access to the website portal and to a desired specific subject matter portion of the website stored thereon, that comprises, providing barcode indicia in the advertisement that respectively uniquely correspond to specific subject matter portions or passages therein;

storing at different specific portions of said website, supplemental pictorial and other material related respectively to such specific subject matter portion(s) of the advertisement and to corresponding respective barcode indicia;

encoding each barcode indicia with a set of digits and sequences thereof that represent and identify the corresponding, URL and the respective specific portions of the website, and also a set of digits and sequences that represent a computer application program of instructions to open a browser and proceed directly to that URL and the specific portion of the website;

enabling the reader of the advertisement to select and scan thereat the desired barcode indicia and transmit the scan signals to the computer;

responding at the computer to the receipt of the reader-selected barcode scan signal transmission by thereupon directly translating the received scanned barcode digits and sequences into a corresponding computer-understandable instruction set to cause the computer thereupon to execute those instructions, thereby automatically to open the browser and proceed directly to the URL and automatically and directly to provide a screen display of the desired supplemental pictorial and other material stored on the corresponding selected subject matter website portion, all without any human intervention, apart from the reader effecting scanning of the selected barcode indicia at the advertisement.

11. The method claimed in claim 10 wherein the reader of the advertisement is remote from the computer, but is enabled to view the display content of the screen.

12. The method of claim 10 wherein the reader scans the barcode at the publication with a barcode electronic reader and transmits the barcode scan signals to the computer by an associated wireless or wired wand transmitter.

13. The method of claim 10 wherein the barcode indicia also includes digital information identifying advertiser-selected customers or potential customers or special groups of advertisement readers for providing selective access thereto of specific website portions not otherwise generally available to web inspection.

14. The method of claim 10 wherein the barcode indicia further includes digit or related information serving as an advertisement reader's response or reply to the advertiser, for noting or tabulation at the computer.

15. The method of claim 10 wherein said translating is effected by providing an application at the computer that receives the scanned barcode digits and translates them into a series of corresponding computer instructions for thereupon being directly executed by the computer automatically to access the desired advertiser's website portion.

16. The method of claim 10 wherein the advertisement is published in a format selected from the group consisting of books, magazines, newspapers, brochures, pamphlets, flyers, sheets and electronically presented "printed" displays.

17. A method of enabling reader users to barcode-control the operation of a computer containing specific programs including pictorial and other material related to specific subject matters, that comprises,
   providing the user with barcode indicia encoded with digits and sequences thereof that respectively correspond to and digitally represent specific computer operational instructions for operating a specific program stored in the computer;
   enabling the user to select and scan a desired barcode indicia and transmit the scan signals to the computer; and
   responding at the computer to the receipt of the user-selected barcode scan signal transmission by thereupon directly translating the received scanned barcode digits and sequences into a corresponding computer-understandable instruction set of said specific program operational instructions to cause the computer thereupon to execute those instructions, thereby automatically and directly to cause the computer to initiate and operate said specific program and provide a screen display of the desired pictorial and other material stored in said specific program, all without any human intervention, apart from the user scanning the selected barcode indicia.

18. The method claimed in claim 17 wherein the user is remote from the computer.

19. The method of claim 17 wherein the user scans the barcode with a barcode electronic reader and transmits the barcode scan signals to the computer by an associated wireless or wired wand transmitter.

20. A method of enabling users to barcode-control the operation of a computer containing specific programs, providing the user with barcode indicia encoded with digits and sequences thereof that respectively correspond to and represent specific computer operational instructions for operating a specific program stored in the computer;
   enabling the user to select and scan a desired barcode indicia and to transmit the scan signals to the computer; and
   responding at the computer to the receipt of the user-selected barcode scan signal transmission by thereupon directly translating the received scanned barcode digits and sequences into a corresponding computer-understandable instruction set of said specific program operational instructions to cause the computer thereupon to execute those instructions, thereby automatically and directly to cause the computer to initiate and operate said specific program, all without any human intervention, apart from the user scanning of the selected barcode indicia.

21. A method of providing a reader of a publication which is associated with a corresponding publisher internet website and portal, with automatic computer display screen access to the website portal and to a desired specific subject matter portion of the website stored thereon, that comprises,
   providing coded indicia in the publication that respectively uniquely correspond to different subject matter portions or passages therein;
   storing at different specific portions of said website, supplemental pictorial and other material related respectively to such different subject matter portions or passages of the publication and their corresponding respective code indicia;
   encoding each indicia with code elements that represent and identify the corresponding URL of the website and the respective specific portions thereof, and also instructions to open a browser and proceed directly to that URL and to said specific portion of the website;
   enabling the reader of the publication to select and effect scan thereat of a desired code indicia and to transmit the scan signals to the computer;
   responding at the computer to the receipt of the reader-selected code scan signal transmission by thereupon directly translating the received scanned code elements into a corresponding computer-understandable instruction set to cause the computer thereupon to execute those instructions, thereby automatically and directly to provide a screen display of the desired supplemental pictorial and other material stored on the corresponding selected subject matter website portion, all without any human intervention, apart from the reader scanning of the selected publication code indicia at the publication.

22. A method of enabling users to coded-indicia-control the operation of a computer containing specific programs, that comprises,
   providing the user with indicia encoded with code elements that respectively correspond to and represent specific computer operational instructions for operating a specific program stored in the computer;
   enabling the scanning of a desired coded indicia and the transmission of the scan signals to the computer; and
   responding at the computer to the receipt of the coded scan signal transmission by thereupon directly translating the received scanned code elements into a corresponding computer-understandable instruction set of said specific program operational instructions to cause the computer thereupon to execute those instructions, thereby automatically and directly to cause the computer to initiate and execute said specific program, all without any intervention, apart from scanning of the selected coded indicia.

23. The method of claim 22 wherein the coded indicia is provided in a publication for scanning by a reader of the publication to access supplemental pictorial and other material stored in or accessible by said program.

24. The method of claim 23 wherein said program enables accessing internet web pages.

25. A method of barcode control of the operation of a computer containing specific programs, that comprises, providing barcode indicia encoded with digits and sequences thereof that respectively correspond to and digitally represent specific computer operational instructions for operating a specific program stored in the computer;

scanning the barcode indicia and transmitting the scan signals to the computer;

responding at the computer to the receipt of the barcode scan signals transmission in an application stored in the computer for translating the received scanned barcode digits and sequences directly into a corresponding computer-understandable instruction set of said specific program operational instructions to cause the computer thereupon to execute those instructions, thereby automatically and directly to cause the computer to initiate and operate said specific program, all without any intervention apart from the scanning of the barcode indicia.

26. The method of claim 25 wherein the computer is remote from the region of the barcode scanning.

27. The method of claim 25 wherein the computer is proximal to the region of the barcode scanning.

28. The method of claim 25 wherein the barcode is provided in a publication for scanning by a reader of the publication to access supplemental pictorial and other material stored or accessible by said program.

29. The method of claim 28 wherein said program enables accessing internet web pages.

30. A method of coded-indicia control of the operation of a computer containing specific programs, that comprises, providing indicia encoded with coded elements thereof that respectively correspond to and represent specific computer operational instructions for operating a specific program stored in a computer;

scanning the coded indicia and transmitting the scan signals to the computer;

responding at the computer to and upon the receipt of the scan code signals transmission in a program application stored in the computer for translating the received scanned code elements into a corresponding computer-understandable instruction set of said specific program operational instructions to cause the computer thereupon to execute those instructions, thereby automatically and directly to cause the computer to initiate and operate said specific program, all without any intervention apart from the scanning of the coded indicia.

31. A method of barcode control of the operation of a computer-stored program, that comprises, receiving at the computer scanned digits of a barcode indicia encoded such as to represent and correspond to specific computer-operational instructions for initiating and executing such computer program; and responding to the received scan digits to effect the automatic and direct execution by the computer of said program.

32. The method of claim 31 wherein said responding comprises providing the computer with an application for translating the received scanned indicia into a corresponding computer program operational instruction set.

33. The method of claim 32 wherein the barcode is provided in a publication for scanning by a reader of the publication to access supplemental pictorial and other material stored in or accessible by said program.

34. The method of claim 33 wherein said program enables accessing internet web portals.

35. A method of coded-indicia control of the operation of a computer-stored program, that comprises, receiving at the computer scanned code elements of a coded indicia encoded such that its code elements represent and correspond to specific computer operational instructions for initiating and executing such computer program; and responding to the received scan code elements to effect the automatic and direct execution by the computer of said program.

36. The method of claim 35 wherein said responding comprises providing the computer with an application for translating the received coded elements into a corresponding computer program operational instruction set.

37. A method of providing a reader of a publication which is associated with one or more electronic storage media selected from the group consisting of a corresponding publisher internet website storing pictorial and other recorded materials, an electronically accessible memory medium for storing such pictorial and other materials, and/or computer-stored or accessible files or archives of pictorial and other materials, with automatic reader-access to the stored pictorial and other materials of the selected storage medium, that comprises, providing coded indicia in the publication that respectively correspond to different subject matter portions or passages therein and as to which corresponding supplemental material is desired by the reader from said selected storage medium;

encoding each coded indicia with code elements that represent and identify a corresponding portion or passage subject matter of the publication and instructions to proceed to and access the corresponding portion of the selected storage medium;

responding at the selected medium to the receipt of reader-initiated coded indicia scan signals transmitted to the selected medium, by directly translating the received scanned coded indicia code elements into corresponding computer and storage media-understandable instructions, thereby to cause the automatic execution of those instructions and directly to enable display on a computer screen of the desired supplemental pictorial and other material stored on the selected storage medium, all without any human intervention, apart from the reader effecting scanning of the selected coded indicia at the publication.

38. The method claimed in claim 37 wherein the reader of the publication is remote from but enabled to view displaying of the content of the screen.

39. The method claimed in claim 37 wherein the supplemental material is selected from the group consisting of pictures, slideshow, documents, video and movie materials.

40. The method claimed in claim 1 wherein the barcode or other code indicia is selected from the group consisting of strips of one-dimensional lines, two-dimensional patterns, optical patterns, and radio frequency RFID and EPC chips.

41. Apparatus for providing a reader or user of a publication which is associated with a corresponding publisher internet website and portal, with automatic computer display screen access to the website portal and to a desired specific subject matter portion of the website stored thereon, having in combination, barcode indicia affixed in the publication that respectively uniquely correspond to different subject matter portions or passages therein;

means for storing at different specific portions of said website, supplemental pictorial and other material related respectively to such different subject matter portions or passages of the publication and corresponding respective barcode indicia;

means for encoding each barcode indicia with a set of digits and sequences that digitally represent and identify the corresponding URL and specific portions of the website, and a set of digits and sequences that represent computer program application instructions to open a browser and proceed directly to that URL and said specific portion(s) of the website; means for enabling the reader of the publication to select and effect scanning of desired barcode indicia and to transmit the scan signals to the computer; and means for responding at the computer to the receipt of the reader-selected barcode scan signal transmission including a computer application translator for thereupon directly translating the received sets of scanned barcode digits and sequences into a corresponding computer-understandable instruction set to cause the computer thereupon to execute those instructions, thereby automatically to open the browser and proceed directly to the URL directly to provide a screen display of the desired supplemental pictorial and other material stored on the corresponding selected subject matter website portion, all without any human intervention, apart from the reader effecting scanning of the selected publication barcode indicia at the publication.

42. The apparatus of claim 41 wherein the reader is provided with a barcode electronic reader and an associated wireless or wired wand transmitter to enable the reader to scan the barcode at the publication with the barcode electronic reader and to transmit the barcode scan signals to the computer by the associated transmitter.

43. The apparatus of claim 41 wherein the barcode indicia also includes digital information identifying publication or website subscribers or a special group of publication readers for providing selective access thereto of specific website portions not otherwise or generally available to web inspection.

44. The apparatus of claim 41 wherein said subject matter portions or passages of the publication comprise product or service advertisements also associated with their own internet website portals and wherein such advertisements are provided in the publication with corresponding barcode indicia coded to identify the specific advertiser's website, with the reader scan of such barcode indicia at the advertisement in the publication automatically causing the displaying on the computer screen of the desired supplemental pictorial and other advertiser material stored on the corresponding subject matter website portion of the advertiser's website.

45. The apparatus of claim 44 wherein the barcode indicia also includes digital information identifying advertiser-selected customers or potential customers or special groups of advertisement readers for providing selective access thereto of specific website portions not otherwise generally available to web inspection.

46. The method of claim 45 wherein the barcode indicia further includes digit or related information serving as an advertisement reader's response or reply to the advertiser, for noting or tabulation at the computer.

47. Apparatus for enabling users to coded-indicia-control the operation of a computer containing specific programs having pictorial and other material related to specific subject matters, having, in combination, indicia encoded with code elements that respectively correspond to and represent specific computer operational instructions for operating such a specific program stored in the computer;

means for enabling the scanning of a desired coded indicia and the transmission of the scan signals to the computer; and means for responding at the computer to the receipt of the coded scan signal transmission, including a computer application translator for thereupon directly and automatically translating the received scanned code elements into a corresponding computer-understandable instruction set of said specific program operational instructions, thereby to cause the computer thereupon automatically to execute those instructions, automatically and directly to cause the computer to initiate and execute said specific program and provide a screen display of the desired pictorial and other material stored in said specific program, all without any intervention, apart from the scanning of the selected coded indicia.

48. Apparatus for enabling users to coded-indicia-control the operation of a computer containing specific programs, having, in combination, indicia encoded with code elements that respectively correspond to and represent specific computer operational instructions for operating a specific program stored in the computer;

means for enabling the scanning of a desired coded indicia and the transmission of the scan signals to the computer; and means for responding at the computer to the receipt of the coded scan signal transmission including a computer application translator for thereupon directly translating the received scanned code elements into a corresponding computer-understandable instruction set of said specific program operational instructions, thereby to cause the computer thereupon automatically to execute those instructions, automatically and directly to cause the computer to initiate and execute said specific program, all without any intervention, apart from scanning of the selected coded indicia.

49. The apparatus of claim 48 wherein the coded indicia is provided in a publication for scanning by a reader of the publication to access supplemental pictorial and other material stored in or accessible by said program.

50. The apparatus of claim 49 wherein said program enables accessing internet web pages.

51. Apparatus for direct coded-indicia control of the operation of a computer-stored program, that comprises, a receiver at the computer for receiving scanned code elements of a coded indicia encoded such that its code elements represent and correspond to specific computer operational instructions for initiating and executing such computer program; and means at the computer for responding to the received scan code elements to carry out the operational instructions they represent and to effect the automatic and direct execution by the computer of said program.

52. The apparatus of claim 51 wherein said responding means comprises an application stored in the computer for translating the received coded elements into a corresponding computer program operational instruction set to which the computer responds.

* * * * *